United States Patent
Surace et al.

(10) Patent No.: US 12,454,893 B2
(45) Date of Patent: Oct. 28, 2025

(54) AIRFOIL ANTI-ROTATION RING AND ASSEMBLY

(71) Applicant: RTX CORPORATION, Farmington, CT (US)

(72) Inventors: Raymond Surace, Newington, CT (US); Robert A. White, III, Meriden, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/586,834

(22) Filed: Feb. 26, 2024

(65) Prior Publication Data

US 2024/0247591 A1 Jul. 25, 2024

Related U.S. Application Data

(63) Continuation of application No. 17/843,434, filed on Jun. 17, 2022, now Pat. No. 11,939,888.

(51) Int. Cl.
*F01D 9/04* (2006.01)

(52) U.S. Cl.
CPC .......... *F01D 9/041* (2013.01); *F05D 2230/60* (2013.01); *F05D 2240/12* (2013.01); *F05D 2300/175* (2013.01); *F05D 2300/6033* (2013.01)

(58) Field of Classification Search
CPC .. F01D 9/041; F05D 2230/60; F05D 2240/12; F05D 2300/175; F05D 2300/6033
USPC ......................................................... 415/191
See application file for complete search history.

(56) References Cited

U.S. PATENT DOCUMENTS

| 2,980,396 | A | | 4/1961 | Movesian | |
|---|---|---|---|---|---|
| 3,040,734 | A | | 6/1962 | Field | |
| 3,843,279 | A | * | 10/1974 | Crossley | F01D 9/042 |
| | | | | | 415/138 |
| 5,232,340 | A | * | 8/1993 | Morgan | F01D 9/042 |
| | | | | | 415/209.2 |
| 5,411,369 | A | | 5/1995 | Bouchard | |
| 5,618,161 | A | * | 4/1997 | Papageorgiou | F01D 25/246 |
| | | | | | 415/190 |
| 6,179,560 | B1 | | 1/2001 | Kouris et al. | |
| 6,234,750 | B1 | * | 5/2001 | Mielke | F01D 25/246 |
| | | | | | 415/209.2 |

(Continued)

OTHER PUBLICATIONS

European Search Report for European Patent Application No. 23179817.4 mailed Nov. 9, 2023.

*Primary Examiner* — Logan M Kraft
*Assistant Examiner* — John D Bailey
(74) *Attorney, Agent, or Firm* — Carlson, Gaskey & Olds, P.C.

(57) ABSTRACT

A method of assembly includes locating a plurality of vanes about an inner circumference of a ring, the ring has a plurality of axially-extending projections circumferentially-spaced around the ring, each of the vanes has a radially outer platform, a flange that projects radially outwardly from the radially outer platform, and a notch that extends axially through the flange such that the notch opens at forward and aft flange faces of the flange, aligning the notch of each of the vanes with a corresponding one of the axially-extending projections on the ring, and inserting the projection into the notch to thereby prevent the vanes from rotating relative to the ring.

6 Claims, 5 Drawing Sheets

(56) References Cited

U.S. PATENT DOCUMENTS

| | | | |
|---|---|---|---|
| 6,514,041 B1* | 2/2003 | Matheny | F01D 11/18 |
| | | | 415/177 |
| 6,913,441 B2* | 7/2005 | Fadok | F01D 9/041 |
| | | | 415/209.2 |
| 7,234,920 B2 | 6/2007 | Imbourg et al. | |
| 7,334,980 B2* | 2/2008 | Trinks | F01D 9/04 |
| | | | 415/230 |
| 7,704,042 B2* | 4/2010 | Brueckner | F01D 25/246 |
| | | | 415/121.3 |
| 8,033,786 B2* | 10/2011 | Durocher | F01D 9/042 |
| | | | 416/208 |
| 8,096,755 B2* | 1/2012 | Kammel | F01D 9/047 |
| | | | 415/173.1 |
| 8,511,975 B2* | 8/2013 | Shi | F01D 25/246 |
| | | | 415/173.1 |
| 8,684,683 B2* | 4/2014 | Brunt | F01D 25/246 |
| | | | 29/889.22 |
| 8,757,964 B2 | 6/2014 | Yamashita et al. | |
| 8,834,106 B2 | 9/2014 | Luczak | |
| 9,051,849 B2* | 6/2015 | Ring | F01D 9/042 |
| 9,121,283 B2 | 9/2015 | Feigleson et al. | |
| 9,435,226 B2* | 9/2016 | Tanaka | F01D 5/005 |
| 9,677,427 B2 | 6/2017 | Synnott | |
| 9,752,592 B2 | 9/2017 | Sippel et al. | |
| 9,976,435 B2* | 5/2018 | Borja | F01D 5/02 |
| 10,041,369 B2* | 8/2018 | Blaney | F01D 11/24 |
| 10,190,429 B2* | 1/2019 | Garrison | F01D 11/003 |
| 10,190,434 B2* | 1/2019 | Westphal | F01D 25/24 |
| 10,753,221 B2* | 8/2020 | Barker | F01D 25/246 |
| 10,801,342 B2* | 10/2020 | Ring | F01D 25/246 |
| 10,822,964 B2 | 11/2020 | McCaffrey | |
| 10,920,618 B2 | 2/2021 | McCaffrey | |
| 10,934,941 B2 | 3/2021 | McCaffrey | |
| 11,015,485 B2 | 5/2021 | Moga et al. | |
| 11,939,888 B2* | 3/2024 | Surace | F01D 9/042 |
| 2006/0051201 A1 | 3/2006 | Correia | |
| 2007/0134087 A1 | 6/2007 | Lee et al. | |
| 2007/0207030 A1* | 9/2007 | Noelle | F04D 29/462 |
| | | | 415/160 |
| 2009/0208322 A1* | 8/2009 | McCaffrey | F01D 11/125 |
| | | | 415/113 |
| 2010/0111682 A1* | 5/2010 | Scoggins | F01D 9/041 |
| | | | 415/134 |
| 2012/0183394 A1 | 7/2012 | Guo et al. | |
| 2012/0308367 A1* | 12/2012 | Luczak | F01D 11/12 |
| | | | 415/173.1 |
| 2013/0011248 A1 | 1/2013 | Croteau et al. | |
| 2013/0209248 A1* | 8/2013 | Ring | F01D 9/042 |
| | | | 415/209.3 |
| 2013/0302151 A1* | 11/2013 | Ring | F01D 25/246 |
| | | | 415/191 |
| 2015/0044044 A1 | 2/2015 | Sippel et al. | |
| 2015/0226124 A1* | 8/2015 | Tsutsumi | F02C 7/28 |
| | | | 415/193 |
| 2015/0252687 A1* | 9/2015 | Arnould | F01D 25/246 |
| | | | 416/95 |
| 2015/0285091 A1 | 10/2015 | Bulgrin et al. | |
| 2016/0003069 A1 | 1/2016 | Mayer et al. | |
| 2016/0003102 A1* | 1/2016 | Synnott | F01D 25/246 |
| | | | 29/889.22 |
| 2016/0123172 A1* | 5/2016 | Mondal | F01D 11/18 |
| | | | 415/136 |
| 2016/0245122 A1 | 8/2016 | Rosset et al. | |
| 2016/0348518 A1 | 12/2016 | Podgorski et al. | |
| 2018/0080477 A1* | 3/2018 | Freeman | F04D 29/522 |
| 2018/0142564 A1* | 5/2018 | Taglieri | F01D 25/246 |
| 2018/0156069 A1* | 6/2018 | Quennehen | F01D 11/08 |
| 2018/0328228 A1 | 11/2018 | Englehart et al. | |
| 2018/0347586 A1* | 12/2018 | Kwak | F04D 29/542 |
| 2019/0226347 A1* | 7/2019 | Kwak | F01D 5/3038 |
| 2019/0353043 A1* | 11/2019 | Stevens | F01D 25/145 |
| 2020/0072084 A1* | 3/2020 | Blaney | F01D 25/246 |
| 2020/0088065 A1* | 3/2020 | Thomas | F01D 25/246 |
| 2020/0131921 A1* | 4/2020 | Johnson | F01D 11/14 |
| 2020/0131939 A1* | 4/2020 | Johnson | F01D 25/246 |
| 2020/0149417 A1 | 5/2020 | McCaffrey | |
| 2020/0158022 A1* | 5/2020 | McCaffrey | F01D 25/24 |
| 2020/0158023 A1* | 5/2020 | McCaffrey | F01D 11/08 |
| 2020/0232332 A1* | 7/2020 | Farrar | F04D 29/54 |
| 2020/0318652 A1* | 10/2020 | McCaffrey | F01D 9/04 |
| 2021/0108524 A1 | 4/2021 | Whittle et al. | |
| 2021/0108525 A1 | 4/2021 | Jarrossay et al. | |
| 2022/0372890 A1 | 11/2022 | Bentley et al. | |
| 2023/0175408 A1 | 6/2023 | Heeter et al. | |

* cited by examiner

AIRFOIL ANTI-ROTATION RING AND ASSEMBLY

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Components in the turbine section are typically formed of a superalloy and may include thermal barrier coatings to extend temperature capability and lifetime. Ceramic matrix composite ("CMC") materials are also being considered for turbine components. Among other attractive properties, CMCs have high temperature resistance. Despite this attribute, however, there are unique challenges to manufacturing and implementing CMCs in such components.

SUMMARY

An example method of assembly according to the present disclosure includes locating a plurality of vanes about an inner circumference of a ring, the ring has a plurality of axially-extending projections circumferentially-spaced around the ring, each of the vanes has a radially outer platform, a flange that projects radially outwardly from the radially outer platform, and a notch that extends axially through the flange such that the notch opens at forward and aft flange faces of the flange, aligning the notch of each of the vanes with a corresponding one of the axially-extending projections on the ring, and inserting the projection into the notch to thereby prevent the vanes from rotating relative to the ring.

In a further embodiment of the foregoing embodiment, the plurality of vanes are ceramic matrix composite.

A further embodiment of any of the foregoing embodiments includes engaging a tab located on each circumferential side of the notch with a corresponding recessed area located on each circumferential side of the corresponding axially-extending projection on the ring.

In a further embodiment of any of the foregoing embodiments, the ring forms a continuous loop.

A further embodiment of any of the foregoing embodiments includes engaging a radially extending projection located on a radially outer side of the ring with a corresponding recess in an engine static structure.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

In this disclosure, like reference numerals designate like elements where appropriate and reference numerals with the addition of one-hundred or multiples thereof designate modified elements that are understood to incorporate the same features and benefits of the corresponding elements.

DETAILED DESCRIPTION

Figure 1:
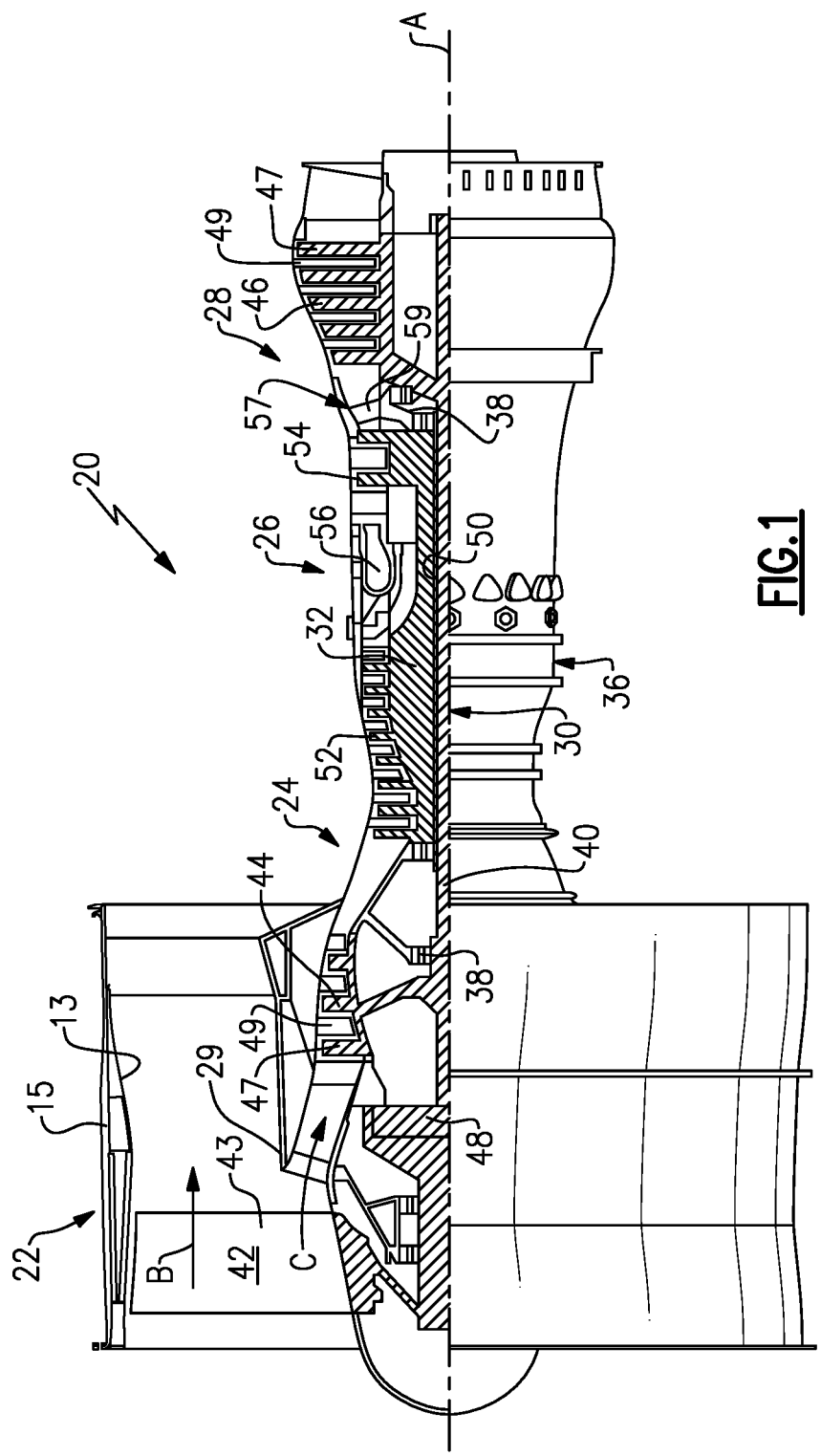
FIG. 1 illustrates an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
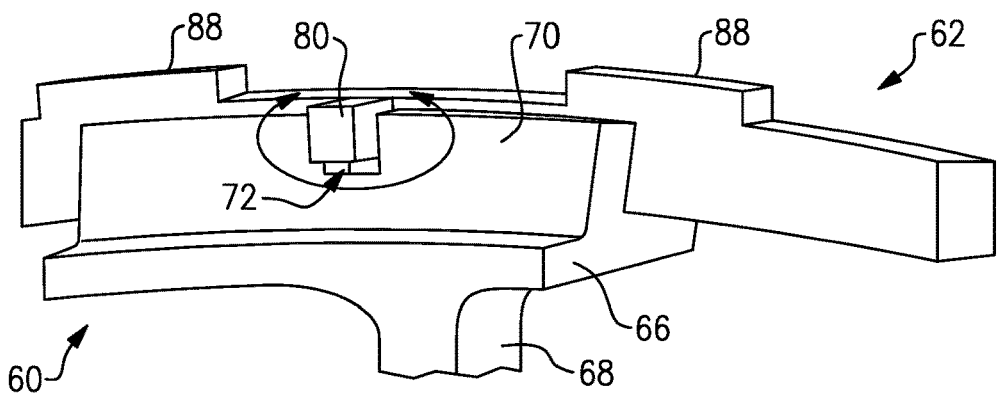
FIG. 2 illustrates a perspective view of an airfoil interfacing with a ring in a turbine section of the gas turbine engine of FIG. 1.
Figure 3:
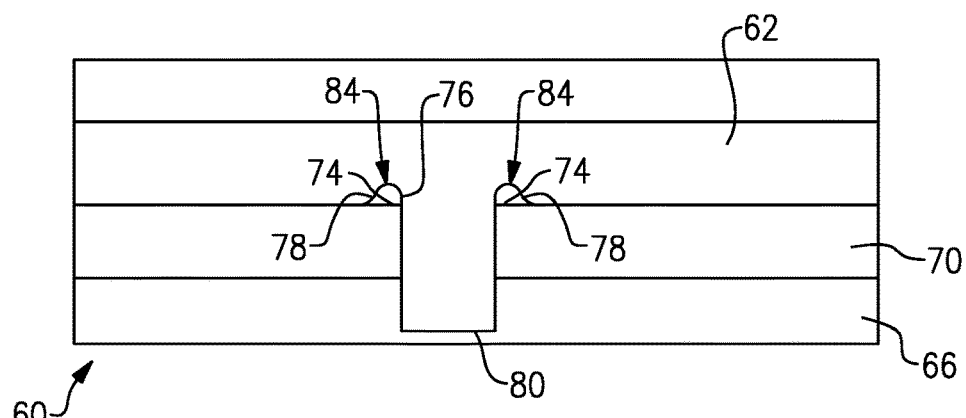
FIG. 3 illustrates a radially inward looking view of the airfoil interfacing with the ring of FIG. 2.
Figure 4:
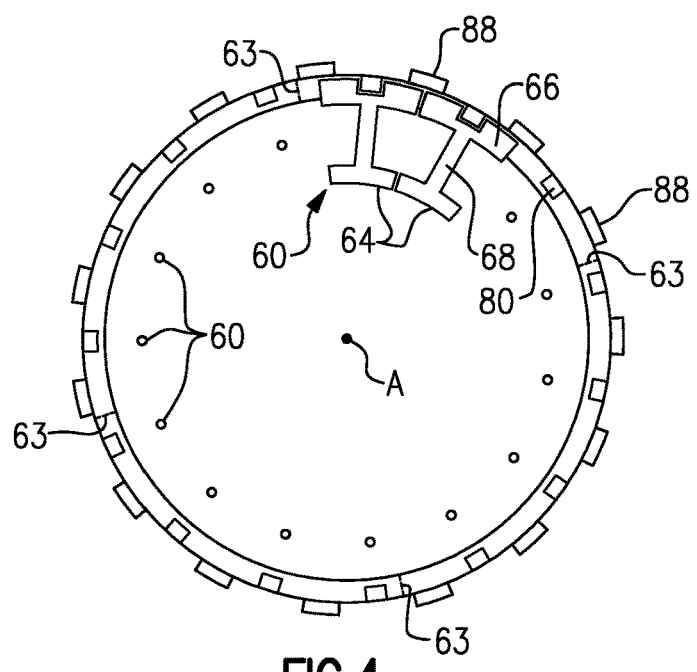
FIG. 4 is a schematic axially downstream view of the ring with airfoils.
Figure 5:
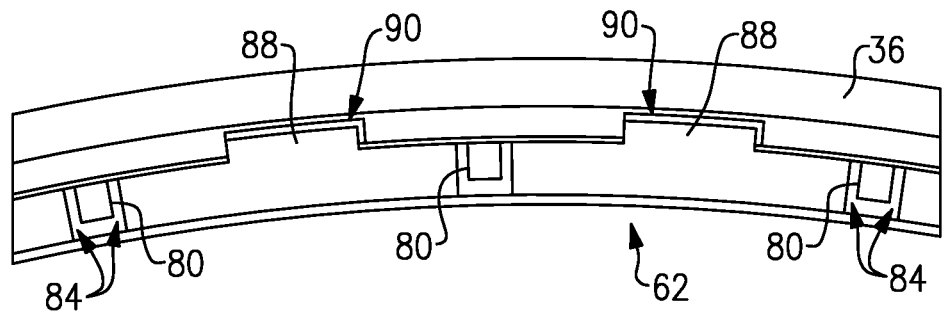
FIG. 5 illustrates the ring of FIG. 2 interfacing with an engine static structure.

FIG. 2 illustrates a portion of the turbine section 28 including a vane 60 positioned on a radially inner side of an anti-rotation ring 62 that prevents rotation of the vanes 60 during use. In the illustrated example, the ring 62 forms a single continuous loop (see FIG. 4). However, the ring 62 can be formed from multiple circumferential segments arranged together to form a loop as illustrated by the dashed lines 63 in FIG. 4.

In the illustrated example, the vane 60 includes a radially inner platform 64 (FIG. 4) connected to a radially outer platform 66 by an airfoil 68. The radially inner and outer platforms 64 and 66, respectively, form a radially inner and outer boundary of the core flow path C through the turbine section 28. The vane 60 may be formed of a ceramic matrix composite, an organic matrix composite (OMC), or a metal matrix composite (MMC). For instance, the ceramic matrix composite (CMC) is formed of ceramic fiber tows that are disposed in a ceramic matrix. The ceramic matrix composite may be, but is not limited to, a SiC/SiC ceramic matrix composite in which SiC fiber tows are disposed within a SiC matrix. Example organic matrix composites include, but are not limited to, glass fiber tows, carbon fiber tows, and/or aramid fiber tows disposed in a polymer matrix, such as epoxy. Example metal matrix composites include, but are not limited to, boron carbide fiber tows and/or alumina fiber tows disposed in a metal matrix, such as aluminum The radially outer platform 66 includes a flange 70 that extends radially outward from a radially outer surface of the radially outer platform 66. The flange 70 is located closer to the trailing edge of the radially outer platform 66 than the leading edge of the radially outer platform 66. The flange 70 includes a notch 72 or recess that extends radially inward from a radially outer edge of the flange 70. In the illustrated example, the notch 72 includes a constant width between a circumferentially inner and a circumferentially outer edge and a radial height that is less than a radial height of the flange 70. In this disclosure, radial or radially, circumference or circumferentially, and axial or axially are in relation to the engine axis A unless stated otherwise.

Figure 6:
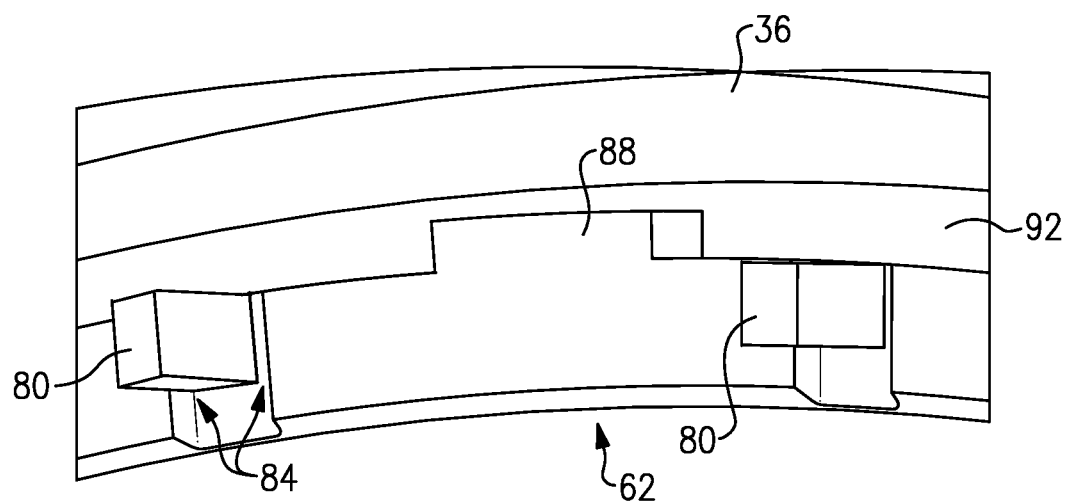
FIG. 6 illustrates a perspective view of the ring and the engine static structure of FIG. 5 with a retainer.

The ring 62 includes axially extending projections 80 that extend from an axially forward or upstream surface of the ring 62. The axially extending projections 80 are evenly circumferentially spaced from each other around the ring 62 and correspond to each of the vanes 60. The axially extending projections 80 include a width equal to or less than a width of the notch 72 to allow the axially extending projection 80 to fit within the notch 72. The ring 62 also includes recessed areas 84 on opposing circumferential sides of each of the axially extending projections 80. Circumferentially inner and upstream edges of the flange 70 are located adjacent the recessed areas 84 to prevent contact between the edges 74 and a body portion of the ring 62 to reduce contact stress and wear between the flange 70 and the ring 62. In particular, the recessed areas 84 are on opposing circumferential sides of the axially extending projection 80 and create an axial gap or spacing with a corresponding one of the edges 74. Also, circumferential sides of the axially extending projection 80 extend upstream from a downstream surface of the ring 62 that is in abutment with the flange 70 on each of the plurality of vanes 60. Furthermore, the edges 74 are at an upstream most location on the flange 70. The recessed areas 84 can also connect with a central recessed area 85 (FIG. 6) located radially inward and circumferentially aligned with the axially extending projection 80.

Figure 7:
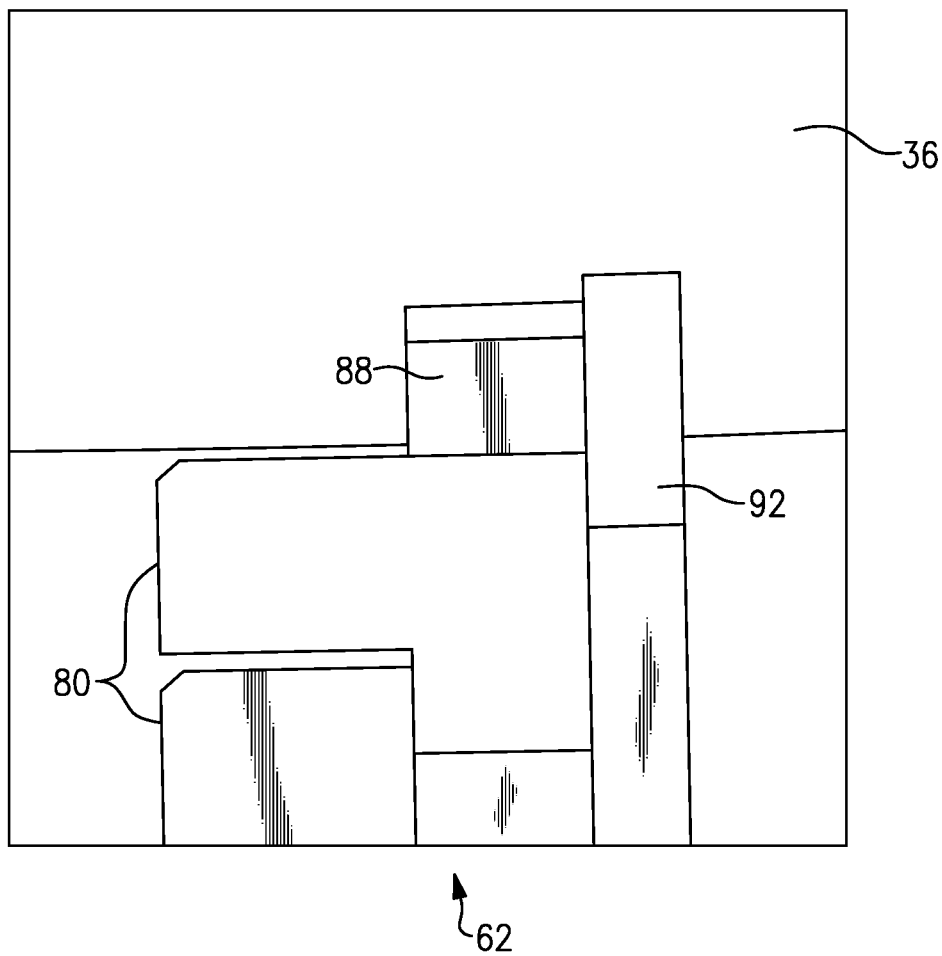
FIG. 7 illustrates a cross-sectional view of the ring, the engine static structure, and the retainer of FIG. 6.

One feature of the recessed areas 84 is that an axially forward surface on the ring 62 can fit flush and in abutment with the an axially aft surface of the flange 70. A lock ring 92 (See FIG. 6-7) can also be placed in abutment with a downstream side of the a downstream surface on the ring 62 to bias the ring 62 into an axially forward position. The biasing force of the lock ring 92 can reduce relative movement between the vanes 60 and the ring 62 and reduce the complexity of installation. The lock ring 92 also reacts out or neutralizes the gas loads which are applied to the ring 62 through the vanes 60.

Furthermore, the assembly of the vanes 60 on the ring 62 when the ring 62 is continuous eliminates the need for additional fixtures at the OD to support the vanes 60 on the ring 62 during installation of the assembly in the gas turbine engine 20. This reduces the complexity of installation and time needed to install the vanes 60 in the gas turbine engine 20.

The ring 62 can comprise a high-temperature capable superalloy, such as an alloy from the Inconel family, Haynes family, Mar-M-509, Waspaloy, or a single crystal Ni superalloy. In one example, the superalloy for the ring 62 is a cobalt-based alloy. One feature of using a cobalt-based alloy for the ring 62 is a reduction in chemical interactions with the CMC material of the vanes 60 at elevated temperatures.

As shown in FIGS. 2, 4, 5 and 6, the ring 62 also includes radially extending projections 88 that extend radially outward from a radially outer surface of the ring 62. The radially extending projections 88 provide a circumferential locating function of the ring 62 relative to an engine static structure 36 such as an engine case or structure intermediate the engine case the and the ring 62. In the illustrated example, the radially extending projections 88 are circumferentially aligned with an intersection between radially outer platforms 66 on adjacent vanes 60 such that there are an equal number of radially extending projections 88 as vanes 60. Also, the radially extending projections 88 include a circumferential dimension that is greater than a circumferential dimension of the axially extending projection 80 and the radially extending projections 88 are circumferentially offset from the axially extending projection 80 in a circumferentially non-overlapping configuration.

The engine static structure 36 also includes recessed areas 90 that are sized to receive the radially extending projections 88. One feature of the recessed areas 90 is to locate the ring 62 and vanes 60 relative to the engine static structure 36. Also, an axially forward or aft side of the recessed areas 90 are open to allow for assembly of the ring 62 and vanes 60 into the gas turbine engine 20 and can later be covered by a plate or other retainer.

Also, one feature of having the ring 62 be continuous, is a that the ring 62 can support the vanes 60 without an additional fixture. This reduces the complexity of installation and time needed to install the vanes 60 in the gas turbine engine 20.

Figure 8:
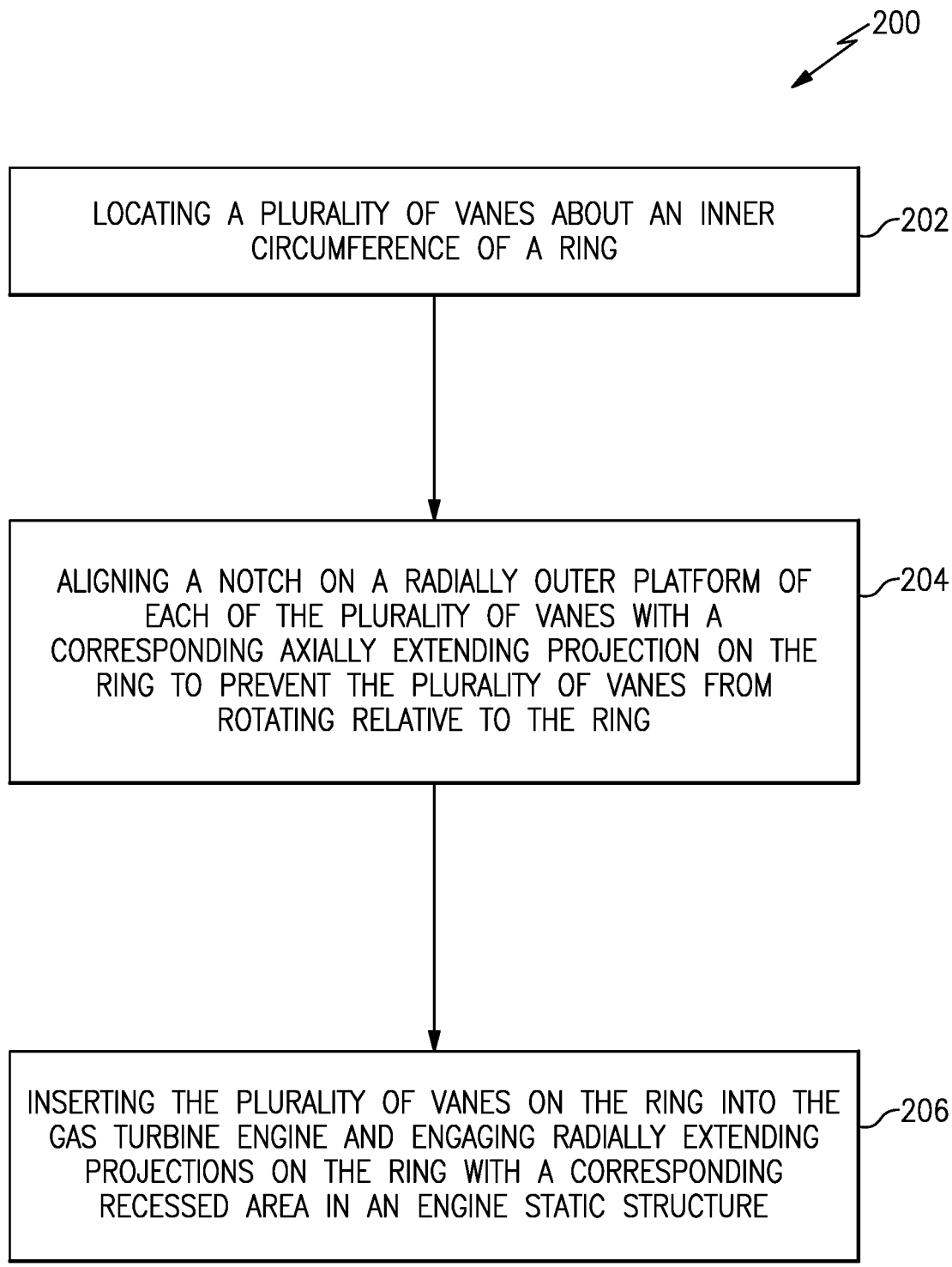
FIG. 8 illustrates a method of assembly.

FIG. 8 illustrates a method 200 of assembly for the vanes 60 into the gas turbine engine 20. The method 200 includes locating the plurality of vanes 60 about an inner circumference of the ring 62 (Block 202) and aligning the notch 72 on the radially outer platform of each of the plurality of vanes 60 with a corresponding one of the axially extending projection 80 on the ring 62 to prevent the plurality of vanes 60 from rotating relative to the ring 62 (Block 204). The plurality of vanes 60 on the ring 62 can then be inserted into the gas turbine engine 20 with the radially extending projections 88 located on the radially outer surface of the ring 62 engaging a corresponding recessed area 90 in an engine static structure 36 (Block 206) to prevent the ring 62 from rotating relative to the static structure 36.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A method of assembly, the method comprising:
locating a ring in an engine case, the engine case includes a radially inner case side that has circumferentially spaced radial recesses, the radial recesses have open axial sides, the ring has a radially outer ring side facing the radially inner case side, the radially outer ring side has circumferentially spaced radial projections corresponding in position to the radial recesses, the locating including engaging the ring and the engine case by moving the ring such that the radial projections are received through the axially open sides into the radial recesses;
locating a plurality of vanes about an inner radial side of the ring, the ring has a plurality of axially-extending projections circumferentially-spaced around the inner radial side, each of the vanes has a radially outer platform, a flange that projects radially outwardly from the radially outer platform, and a notch that extends axially through the flange such that the notch opens at forward and aft flange faces of the flange; and
aligning the notch of each of the vanes with a corresponding one of the axially-extending projections on the ring and inserting the projection into the notch to thereby prevent the vanes from rotating relative to the ring, and wherein the radial projections are circumferentially aligned with intersections between the radially outer platforms of adjacent ones of the vanes.

2. The method of claim 1, wherein a circumferential dimension of each of the radial projections is greater than a circumferential dimension of each of the axially-extending projections.

3. The method of claim 2, wherein the radial projections are circumferentially offset from the axially-extending projections.

4. The method of claim 3, wherein the radial projections are circumferentially non-overlapping with the axially-extending projections.

5. The method of claim 1, wherein the plurality of vanes are ceramic matrix composite.

6. The method of claim 1, wherein the ring forms a continuous loop.

* * * * *